May 31, 1966     O. HAGEN     3,254,248
EXPANDABLE PRESSURE BARRIER BACKUP MEANS
FOR A DYNAMOELECTRIC MACHINE
Filed Dec. 14, 1962     2 Sheets-Sheet 1

INVENTOR
Oskar Hagen
BY
ATTORNEY

United States Patent Office
3,254,248
Patented May 31, 1966

3,254,248
EXPANDABLE PRESSURE BARRIER BACKUP
MEANS FOR A DYNAMOELECTRIC MACHINE
Oskar Hagen, Hempfield Township, Westmoreland County, Pa., assignor to Westinghouse Electric Corporation,
East Pittsburgh, Pa., a corporation of Pennsylvania
Filed Dec. 14, 1962, Ser. No. 244,629
12 Claims. (Cl. 310—86)

This invention is directed generally to pressure barriers and more specifically backup sleeve arrangements for such pressure barriers which are subjected to axial strains. This invention further relates to dynamoelectric machinery wherein the rotor bore of the machine is sealed from the stator bore by a rotor enclosure or can and to a new and improved backup means for the rotor enclosure.

In the construction of dynamoelectric machinery having a sealed rotor bore formed by the use of a rotor enclosure or can, commonly known as a canned motor, the rotor enclosure or can is formed from relatively thin material extending substantially along the entire length of the rotor bore. The can engages the interior of the annular stator frame and extends axially outwardly from the ends of the stator frame to engage end pieces of the motor housing. Inasmuch as the rotor bore is frequently subjected to high pressures, for example, 2000 to 3000 p.s.i., the pressure on the interior of the can expands the can into frictional engagement with the stator frame. This internal pressure also acts to expand the can into engagement with the end pieces of the housing and further acts to elongate the housing, i.e., to move the end pieces further apart in the axial direction. In the canned motor construction, a backup sleeve normally is provided between each of the ends of the stator frame and the adjacent end of the housing for the purpose of engaging the can and restraining radial movement thereof toward the stator bore.

The type of backup sleeves forming the prior art normally comprise a singular annular member which extends between one end of the stator frame and the adjacent housing end ring and closely receives the rotor enclosure or can therewithin. The prior art backup sleeves normally are of a unitary construction which are formed to minimize axial clearances between the backup sleeve and the adjacent end ring and the stator frame. The internal pressure of the rotor bore causes the rotor enclosure or can to be expanded against the backup sleeve thus necessitating the use of a rigid backup sleeve capable of sustaining the internal rotor pressures without plastic deformation. Any axial clearances between the backup sleeve and the adjacent portions of the stator frame and housing end ring desirably are minimized to prevent the expansion of the relatively thin can into such axial clearance spaces, which expansion would result in a concentration of strain at those points in the can, hastening fatigue and ultimately, cause failure. Upon application of internal pressure to the can, the increase in the axial spacing of the end rings stretchs the can and creates strains therein. By virtue of the frictional engagement of the can with the backup sleeve caused by the internal pressure, the stretching of the can or axial can movement, takes place at the points of least resistance, i.e. at the axial gaps at the ends of the backup sleeves. Since each backup sleeve of the prior art has, at most, only two axial gaps associated therewith, the stretching movement of the can is concentrated only at these axial gaps. This concentration of stress ultimately results in can fatigue at the gaps. Of course, if the gaps are relatively large, when compared to the can thickness, the can will radially move into the gaps. Such radial movement of the can will result also in can fatigue or failure, particularly if the motor is subjected to frequent pressure cycling.

Operating experience with canned motors having high internal rotor bore pressures have shown that it is impossible to eliminate such axial clearances because of the relative thicknesses of the adjacent housing parts and the backup sleeve. Relative differential expansion of these components usually occurs when the canned motor is utilized in a high temperature application. When thermal cycling of such high temperature systems occur, the axial clearances or gaps between the backup sleeve and the adjacent portions of the end ring and the stator frame also cause the can to be stretched axially at the gap, resulting in the same problems as those discussed in connection with pressure variations. Thus, for each backup sleeve, axial motion of the can at the axial clearances or gaps occurs at the extremities of the backup sleeves. In systems subjected to both temperature and pressure variations, substantial axial motion of the can at the two axial gaps for each backup sleeve occur even more frequently.

Since it has been determined that it is impossible to eliminate such axial clearances or gaps, the purpose of this invention is to reduce the can stresses and the resulting motion of the can at the axial clearances or gaps by reducing the size of each gap and by providing an increased number of gaps thereby spreading the stresses and the axial can movement more uniformly along the can.

Accordingly, an object of this invention is to provide a new and improved canned dynamoelectric machine having a novel can backup sleeve construction which acts to prevent can fatigue and failure.

A further object of this invention is to provide a new and improved backup structure for use in conjunction with a pressure barrier subjected to axial strain.

It is another object of this invention to provide a new and improved canned motor having a novel construction of a backup sleeve for the can which reduces axial movement of the can at any given axial position of the can.

Still another object of this invention is to provide a novel canned motor construction wherein stresses in the can due to internal rotor pressures are spread relatively uniformly along the can.

A further object of this invention is to provide a novel backup sleeve for a canned motor wherein the backup sleeve comprises a plurality of spaced tandemly mounted annuli which form a plurality of axially spaced gaps.

Briefly, the present invention accomplishes the above objects by providing a new and improved backup sleeve for an apparatus having a can or pressure barrier separating a high pressure region from a low pressure region. The back-up sleeve is of the segmented type; that is, comprising a plurality of annular members or rings mounted coaxially in tandem between each end of, for example, a stator frame and the adjacent end ring of a motor housing. Each of the coaxial, tandemly mounted rings are axially spaced a predetermined, relatively small distance apart with the can disposed in the ring openings in engagement with the rings to permit axial can movement at each gap between adjacent rings. In this manner, relatively small axial can movement is provided at many spaced points along the can rather than being concentrated at only two points for each backup sleeve, pursuant to the prior art. The axial length of each of the backup sleeve segments or rings desirably are not longer than the friction length in the can, as will hereinafter be more fully explained. Each of the can segments or rings is provided at its outer radial extremity with an outwardly extending projection and means such as relatively thin spacing cylinders, are disposed between each pair of adjacent projections to ensure a predetermined amount of axial spacing between adjacent segments. Each of the outer spacing rings or sleeves also serves to align the backup sleeve segments to make a rigid assembled unit. In addition, by virtue of the relative thickness of the backup rings and the spacing sleeve, during compression of the segmented backup sleeve caused by transient thermal changes in the dynamoelectric machine, the spacing sleeves act as springs to provide uniform reduction of the axial gaps therebetween. When the dynamoelectric machine is no longer subjected to the transient thermal changes the springs act uniformly to restore the gaps between adjacent sleeves.

Further objects and advantages of this invention will become apparent as the following description proceeds and features of novelty which characterize the invention will be pointed out in particularity in the claims annexed to and forming a part of this specification.

For a better understanding of this invention, reference may be had to the accompanying drawings, in which.

Figure 1:
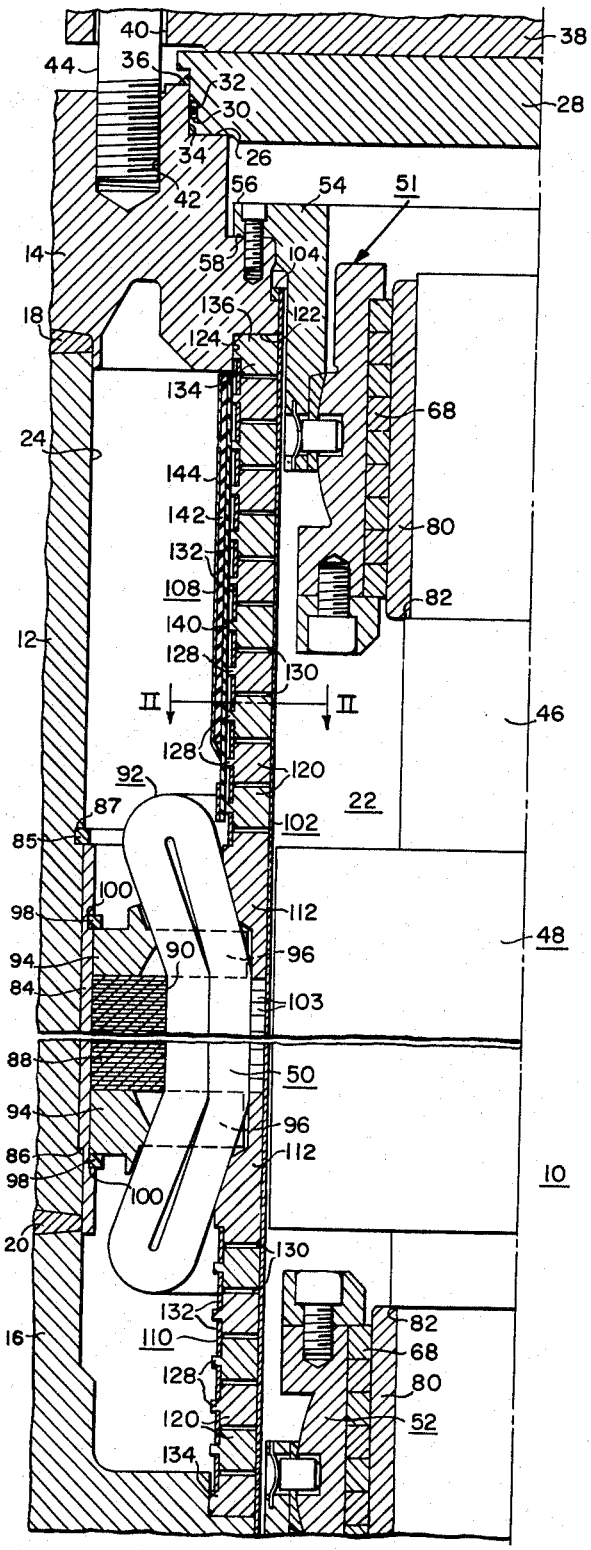
FIGURE 1 is a sectional view of a canned motor having a can backup sleeve constructed in accordance with the principles of this invention and having the rotor portions thereof shown in elevation.
Figure 2:
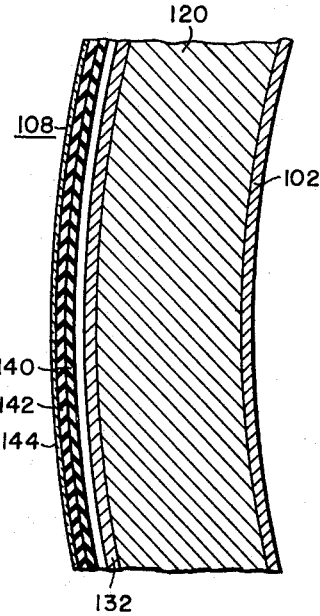
FIG. 2 is a sectional view of a portion of the backup sleeve illustrated in FIG. 1 and taken along the lines II—II of FIG. 1.

Referring now to FIGS. 1 and 2, a dynamoelectric machine of the canned rotor type is illustrated in FIG. 1 and designated generally with the reference character 10. The dynamoelectric machine or motor 10 is provided with a relatively thick outer tubular housing 12, shown in part in FIG. 1. The housing 12 terminates at its ends with a pair of end members or rings 14 and 16 which are respectively secured thereto by relatively large circumferential welds 18 and 20. The inner ends of the annular end members 14 and 16 define the rotor bore 22 of the motor 10 with the annular rings 14 and 16 also defining the annular stator bore or cavity 24. It is to be noted that FIG. 1 is illustrative of a sectional view through one-half of the can motor with the other half being formed substantially in the same manner as the portion illustrated in FIG. 1. The upper end ring 14 is formed with an upwardly facing shoulder 26 which receives a complementary shaped generally circular cover member 28 which serves to seal the upper end of the motor housing 12. The cover plate 28 is desirably provided with a circumferential recess 30 disposed on the outer periphery thereof which is formed to receive a sealing means such as an O-ring 32 therein. The O-ring 32 is sized to frictionally engage the upper side wall 34 of the end ring 14 to facilitate the sealing of the cover plate 28. In addition, hermetic sealing of the upper end of the motor 10 is achieved by the provision of a circumferential weld 36 between the cover plate 28 and the upper end ring 14. The cover plate 28 is fixedly secured in position by a retainer 38, shown in part in FIG. 1. The cover 38 is provided with a portion adjacent its outer periphery which overlies a portion of the upper end ring 14. A plurality of openings such as the opening 40, are disposed in alignment with threaded recesses 42 formed in the upper end ring 14. Securing means such as lag bolts 44 pass through the openings 40 and are threadedly received in the openings 42 to fixedly position the retainer 38 in engagement with the cover plate 28.

In the rotor cavity 22 there is provided an elongated shaft 46 having a rotor 48 mounted thereon in a position juxtaposed to the stator frame 51 of the motor. The rotor 48 is shown schematically in FIG. 1 and desirably is of the squirrel cage type. The shaft 46 and rotor 48 desirably are mounted in the rotor cavity 22 by antifriction means 51 and 52 disposed respectively above and below the rotor 48 and illustrated in this embodiment of the invention as sleeve bearings. The upper sleeve bearing 50 has a sleeve 68 and mounted on a generally L-shaped annular support member 54 having its leg 56 disposed on a shoulder 58 formed on the upper end ring 14. The bearing sleeve 68 closely receives therein a shaft wear ring 80 which is desirably shrunk fit on the upper end of the shaft 46 in engagement with outwardly facing shoulder 82.

The lower bearing 52 is similar to the upper bearing 51 and is secured to end ring 16 in a similar manner.

The annular stator cavity of a dynamoelectric machine 10 is provided with an annular stator frame or assembly 50 which surrounds the rotor bore 22 and which is juxtaposed to the rotor 48. The stator structure 50 includes an annular stacking shell 84 closely received adjacent the interior surface of the housing 12 and mounted on an inwardly facing shoulder 86 in the housing 12. Means such as a shear ring 85 may be disposed in an annular recess 87 formed in the inner surface of the housing 12 for fixedly positioning the shell 84. The stator structure 50 includes a plurality of annular laminations 88 which are stacked within the stacking shell 84 and which include a plurality of axially extending winding slots 90 therein disposed to receive axially extending stator conductors such as the conductor 92 illustrated in FIG. 1. A pair of finger plates 94 are disposed respectively above and below the laminae 88. Each of the finger plates 94 is of annular configuration and is closely received within the stacking shell 84. The finger plates 94 include a plurality of radially extending fingers 96 (shown in dotted lines in FIG. 1) with the fingers 96 being interleaved between adjacent conductors 92. Each of the fingers 96 extends closely toward the rotor bore 22 of the motor 10 and serves to receive therebetween and position the end turns of the conductors 92. The laminae 88 and the finger plates 94 are disposed in the stator bore 24 and are fixedly positioned with respect to the stacking plate 84 by a pair of annular shear rings 98 which are received in complementary annular recesses 100 formed in the inward surface of the stacking shell 84. Each of the winding slots 90 is closed adjacent the rotor bore 22 by a plurality of slot wedges 103 formed from ceramic material and which are stacked in tandem along the inner edge of the winding slots 90. The closure members, the inward surface of the laminae 88 and the slot wedges 103 cooperate to provide a smooth cylindrical surface defining the rotor bore 22 of the motor 10.

In a canned motor, the stator chamber 24 is hermetically sealed from the rotor chamber 22 to permit the rotor chamber 22 to be exposed to the interior of a system in which the motor 10 is utilized. Such systems may include liquid systems wherein the liquid is subjected to relatively high pressures. By hermetically sealing the stator chamber relative to the rotor chamber, the electrical portions of the motor are not subjected to the liquid and thereby may be operated without endangering or short circuiting the stator windings. In furtherance of this purpose, a stator enclosure or can 102 is provided to serve as a barrier between the rotor chamber 22 and the stator chamber 24. The can 102 extends axially along the outer circumference of the rotor chamber 22 between the end rings 14 and 16 of the housing 12. Hermetic sealing of the can 102 to the end rings 14 and 16 is achieved by the use of circumferential welds therebetween such as the weld 104 between the can 102 and the upper end ring 14. For use in a high speed motor, the can 102 desirably is formed from a high resistance material thereby serving as a part of the air gap of the motor. In order to keep the motor air gap at a desired size, it is necessary to make the can 102 of relatively thin material, for example, the can thickness desirably is 17 mils. For a low speed dynamoelectric machine, the can 102 may be formed from a material of intermediate magnetic permeability for the purpose of minimizing the air gap of the motor without short circuiting the flux about the can 102.

In applications where the rotor bore 22 is subjected to a high system pressure, the portion of the can 102 juxtaposed to the laminae 88 and the slot wedges 103 is expanded by virtue of the system pressure against the laminae 88 and the slot wedges 103. Similarly, the portions of the can 102 juxtaposed to the end rings 14 and 16 are expanded by virtue of the system pressure against the end rings 14 and 16. Radial movement of those portions of the can 102 disposed between the end rings 14 and 16 and the laminae 88 is restrained by backup sleeve means 108 and 110. The backup sleeve means 108 is disposed between the laminae 88 and the upper end ring 14 while the backup sleeve means 110 is disposed between the laminae 88 in the lower end ring 16.

Each of the backup sleeve means 108 and 110 includes a main backup ring 112, each of which is positioned in engagement with the opposed ends of the laminae 88. The main backup rings 112 are fixedly positioned with respect to the laminae 88 so that the contiguous portions thereof are in engagement with the laminae 88 resulting in zero axial clearance between the main backup rings 112 and the laminae 88 at ambient temperatures and under atmospheric pressure. Each of the main backup rings 112 is of annular configuration and includes a flared portion conforming in shape with the adjacent winding end turns.

The remainder of the backup means 108 is formed by a plurality of tandemly arranged ring members or segments 120 which extend between the upper end of the main backup ring 112 and a downwardly facing surface 122 formed in a recess 124 on the upper end ring 14. Each of the rings 120 is provided with an outwardly extending circumferential projection 128 formed on the outward radial surface thereof. Each of the rings 120 desirably is spacedly disposed with respect to the adjacent backup rings resulting in substantially equal axial gaps 130 therebetween. Spacing means are provided to ensure accurate spacing and sizing of the gaps 130 between the tandemly mounted rings 120. The spacing means in this arrangement of the invention, desirably is formed by a plurality of relatively thin cylindrical members 132 which extend between adjacent projections 128 on the rings 120 and may be formed from the same material as the can 102. The upper segment of the backup means 108 comprises an annular ring 134 disposed in the recess 124 of the upper end ring 14 with the upper surface of the ring 134 being in engagement with the surface 122 of the recess 124. A suitable spacing projection 136 is formed on the upper ring 134 to space the ring 134 from the adjacent ring 120 by means of a spacing cylinder 132 extending between the projection 136 and the adjacent projection 128. The outward surfaces of the rings 120 of the backup sleeve 108 are disposed within a retaining cylinder 140 formed from a suitable material, for example, a resinous laminate. If desired, the retaining cylinder 140 may be disposed within another retaining cylinder 142 formed from the same material as the cylinder 140 with the cylinder 142 being covered with a suitable heat and electrical insulation material 144. The insulating material 144 desirably is wrapped about the cylinder 142 and may comprise a resin impregnated glass tape. The retaining cylinders 140 and 142 and the insulating material 144 desirably acts to prevent electrical arcing from the conductors 92 or electrical leads connected thereto (not shown) to the backup sleeves 108. Since no electrical leads are connected to the lower ends of the conductors 92, no assembly of cylinders 140 and 142 and insulating material 144 need be utilized in conjunction with the lower backup means 110. However, if desired such an electrical insulation assembly could be so used. The lower backup means 110 while differing in size from the upper backup means 108 is formed from similar components as the upper backup means 108. Accordingly, like parts will be designated by the same reference characters and will not be described in detail again. Thus, the lower backup means 110 comprises a plurality of tandemly mounted spaced segments 120 having axially extending gaps 130, desirably of a size between 2 to 10 mils, therebetween. The rings 120 include projections 128 extending circumferentially about the outer surface thereof and cooperating with spacing cylinders 132 to maintain the size of the gaps 130.

The portions of the can 102 juxtaposed to the segmented backup means 108 and 110 are expanded into engagement with the backup means 108 and 110 by virtue of internal pressures in the rotor cavity 22. Accordingly, each of the portions of the can 102 juxtaposed to the axial gaps 130 will be subjected to tensional stresses. However, as the tensional stresses in the can are spread over a relatively large surface and the resulting axial movement of the can 102 at the gaps 130 takes place at a plurality of spaced points rather than at extremities of the unitary backup sleeve, as with prior art structures. In this manner, the relative can movement at any given point is relatively small thereby decreasing to a substantial degree the possibility of metal fatigue at the gaps and ultimately the possibility of failure of the can, resulting in exposure of the stator structure to the rotor chamber 22 and successive motor failure. It will be noted that the assembly of segmented backup means 108 and 110 comprising tandemly spaced ring members 120 and spacer means 132 between adjacent ring members results in a rigid structure which serves in part to supportedly mount the stator laminae 88 and the main backup means 112 in the position illustrated in FIG. 1.

The spacing cylinders 132 act as resilient members during certain thermal cycling of the motor 10. For example, when the temperature of the motor components and the rotor chamber 22 are at equilibrium and heat is transmitted to the fluid in the rotor chamber 22, the increase in the fluid temperature acts to heat up the backup means 108 and 110 substantially faster than the heating of the thicker end rings 14 and 16 and the outer casing 12. The relatively thin backup means 108 and 110 expand axially faster than the outer housing 12 and the end rings 14 and 16. The can 102 by virtue of the pressure in the rotor cavity 22 remains expanded against the stator laminae 88, the main backup rings 112, the end rings 14 and 16 and the segments 120 and 134 of the backup sleeves 108 and 110. The heating of the backup sleeves 108 and 110 cause axial expansion of the rings 120 and 134 thereof resulting in a decrease in the axial length of each of the gaps 130. Concurrently, the spacing sleeves 132 elongate axially and are placed in compression by virtue of their elongation and of the decrease in the gap length. As system operation continues, however, the relatively heavy outer casing 12 and end rings 14 and 16 return to equilibrium with backup means 108 and 110 causing the axial distance between the end rings 14 and 16 to increase by virtue of longitudinal expansion of the outer casing 12. This increase in axial distance between the end rings 14 and 16 will result in the restoring of the size of the gaps 130, which are aided by the resilient nature of the spacing sleeves 134.

Similarly, from conditions of thermal equilibrium, the cooling transient of the backup means of this invention cooperates to achieve a desired result. The cooling transient can be commenced by introducing into the rotor cavity 22, a quantity of relatively cool fluid. Again, by virtue of the relative thicknesses of the backup means 108 and 110 when compared with the shell 12 and end rings 14 and 16, the backup means 108 and 110 are cooled faster than the shell 12 and the housing end rings. Because of the high internal pressure of the rotor cavity, the can 102 and the rings 120 and 134 of the backup means 108 and 110 move as a unit. Thus, the cool fluid causes an axial contraction of the rings 120 and 134 resulting in an increase in the size of the gaps 130. Those portions of the can 102 adjacent each of the gaps 130 are stretched. This stretching of the can under these circumstances takes place at each of the gaps 130 thereby resulting in a relatively small elongation of the can at any one gap. It can be appreciated that with the unitary backup sleeves of the prior art, such elongation of the can would be concentrated at either one or both extremities of each backup ring resulting in the creation of substantially larger strains which approach the yield point of the can. Ultimately, the cooling of the rotor cavity 22 results in the restoration of an equilibrium temperature in the motor housing and the outer shell 12 contracts to decrease the axial spacing between the end rings 14 and 16, thereby removing the tensional force on the can 102 and restoring the can to its position prior to cooling. It will therefore be seen that the heating cycle and the cooling cycle constitute a complete strain cycle for the can 102.

It is obvious to those of ordinary skill in the art that the best solution to the strain problem in the can would be one wherein there were no axial gaps along the entire axial dimension of the can 102. However, by virtue of the relative thicknesses and positions of the backup sleeves and the outer casing 12 and end rings 14, these members do not reach the same temperature at the same time during transient operation of the system. Thus, differing longitudinal expansions of the backup means and of the housing components occur resulting in the creation and removal of such axial spacing.

Keeping in mind that axial spacing along the can 102 does occur and cannot be easily eliminated, it is an important purpose of this invention to reduce the resulting axial movement of the can at such axial spaces at any given point. In this manner, the axial movement of the can at axial spaces between adjacent segments of the backup means 108 and 110 is decreased at any given point and is strained to a substantially lesser degree at a plurality of spaced axial positions along the can 102.

In constructing a segmented backup ring pursuant to the principles of this invention, it is important to note that the axial dimension of the segments 120 of the backup rings 108 and 110 desirably are not longer than the friction length of the can 102. The friction length of the can 102 is defined to be that portion of the can which is subjected to axial movement at the axial spaces between the backup ring and the other portions of the motor housing. More specifically, the friction length, $L$, is defined by the following equation:

$$L = \sigma h / \mu P \quad (1)$$

where $\sigma$ = axial stress in can 102 (determined from the motion at an axial gap 130)

$\mu$ = friction coefficient between can 102 and backup sleeve 108 or 110 (the magnitude of which is determined by tests)

$h$ = thickness of can 102

$P$ = pressure in rotor cavity 22

In one example of this invention the quantities in Equation 1 were determined as follows:

$\sigma = 30,000$ lb./in.$^2$
$h = 0.017$ inch
$\mu = 0.23$
$P = 2,000$ lbs./in.$^2$ Substituting in Equation 1 friction length = $L = 1.11$ inches.

Thus, under the above conditions the axial dimension of the segments or rings 120 could be chosen to be one inch.

Figure 3:
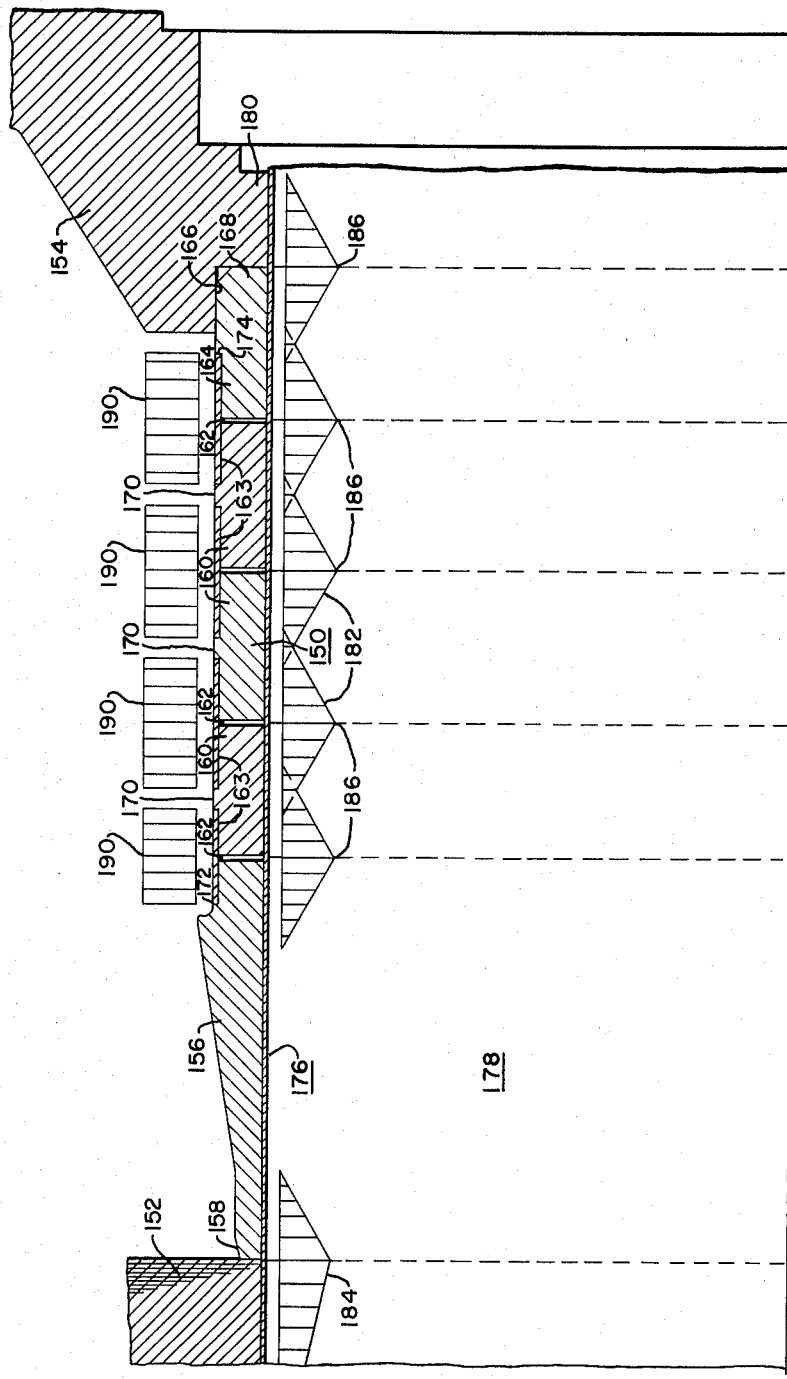
FIG. 3 is a sectional view of another embodiment of the backup sleeve forming a part of this invention and illustrating therein the stress patterns of the rotor enclosure or can which results from the use of the backup sleeve illustrated therein.

Referring now to FIG. 3 of the drawings, there is illustrated schematically a backup ring of modified form constructed in accordance with the principles of this invention and disposed between an end ring and stator frame of a canned motor. More specifically, the backup ring assembly 150 is of segmented form and is disposed between motor laminae 152 corresponding to the laminae 88 of FIG. 1 and an end ring 154 corresponding to the upper end ring 14 of FIG. 1. The backup means 150 in FIG. 3 includes a main annular backup ring 156 corresponding to the main backup ring 112 of FIG. 1 and having a tapered end 158 disposed in engagement with the adjacent end of the laminae 152. The segmented backup means 150 includes a plurality of tandemly mounted spaced segments or rings 160 having axial spaces 162 therebetween and a ring 164 received within a recess 166 in the end ring 154 and having its right-hand end 168 in engagement with the adjacent surface of the recess 166. The spacing 162 is provided also between the tandemly mounted rings 160 and the main backup sleeve 156 as well as between the adjacent ring 160 and the ring 164. Each of the rings 160 forming the backup ring 150 is provided with a projection 170 circumferentially about its outer surface and the main backup ring 156 is provided with a circumferential projection 172 juxtaposed to the adjacent projection 170. Similarly, the ring 164 is provided with a circumferential projection 174 along its outer surface juxtaposed to the projection 170 on the adjacent segment 160. In this manner, resiliently mounted spacing cylinders 163 similar to the spacing cylinders 132 of FIGS. 1–2 may be mounted between the adjacent projections 170, 172 and 174. As illustrated in FIG. 3, a rotor can 176 extends along the entire rotor cavity 178 and engages respectively at its outward surface the laminae 152, the main backup ring 156, the rings 160 and 164, and a portion 180 of the end ring 154.

Upon applying pressure to the rotor cavity 178, the internal rotor cavity pressure will cause a slight elongation of the axial distance between the laminae 152 and the end ring 154. This elongation results in the application of a relatively small tensile stress on the can 176 and may further result in the creation of axial gaps between the end 158 of the main backup sleeve 156 and the stator laminae and between the end 168 of the ring 164 and the end ring 154.

The rotor can 176 desirably is stressed tensionally so that the resulting stresses at any given point along the can 176 does not exceed the yield strength of the material at that point. Accordingly, the ideal case would be where the magnitude of the tensional stress would be equal at all points on the rotor can 176. In accordance with the instant invention the stress pattern created in the rotor can 176 is illustrated diagrammatically in FIG. 3 by the curves 182 and 184. The curves 182, viewing FIG. 3 while disposed horizontally, each depicts along its horizontal axis the position of the can, while along its vertical axis the magnitude of the axial stress in the can is depicted. Viewing FIG. 3 it will be noted that the stress pattern depicted by the curve 182 is at a maximum adjacent each of the clearances 162 and at the clearance adjacent the end 168 of the ring 164. The curves 182 also depict the portions of the can which undergo axial movement and the magnitude of such movement. It will be noted, therefore, that the curves 182 show that a plurality of relatively small axial movements of the can 176 take place along a large area of the can 176 with each of such axial movements being of such a relatively small magnitude that can fatigue does not occur. The maximum movement of the can takes place at the peaks 186, that is at each of the axial gaps. In addition, it is to be noted that the curve 184 depicts that a tensional stress in the can 174 is created in the gap adjacent the end 158 of the main backup sleeve 156. Thus, it will be realized from the curves 182 and 184 that the ideal system wherein the tensional strain on the can 176 is equal at every point along the can is reached more closely by the arrangement defined in this invention than those arrangements forming the prior art. In the prior art arrangements a concentration of the stress at one or two gaps adjacent the extremities of the backup sleeve would result in a concentration of can movement at those gaps, which movement and the stresses which cause such movement would be of such magnitude as to cause fatigue of the can. By spreading the total movement of the can relative to the backup sleeve to a plurality of spaced points the movement of the can at any single point is substantially decreased.

Furthermore, it is to be realized that if desired the main backup ring 156 could also be formed from a plurality of segmented rings with spacer means such as the spacers 132 of FIGS. 1 and 2 between adjacent segments to distribute the stress along the can even more.

In FIG. 3 there is also presented a graphical illustration of the stresses created in the spacing sleeves 163. This illustration is depicted by the curves 190 which illustrate along the vertical axis the magnitude of the stress and along the horizontal axis the position of the spacer 163 at which the stress is located. Viewing the curves 190, it will be noted that the stresses in the spacers 163 are substantially equal in magnitude along the length of the spacers 163. This is because only axial stresses are present therein.

From the foregoing description of detailed embodiments of this invention, it will be realized by those of ordinary skill in the art that many modifications can be made in the specific embodiments described herein without departing from the broad spirit and scope of this invention. Furthermore, modified arrangements of the backup means can be achieved to fulfill the aims and purposes of this invention as set forth herein. In this light, it is specifically intended that the embodiments described and illustrated in this specification be interpreted as illustrative, rather than in a limiting sense.

I claim as my invention:

1. In a dynamoelectric machine, a hollow housing hav- a stator structure mounted therein and shaped to define a central rotor bore and an annular stator bore surrounding said rotor bore, a generally cylindrical enclosure means disposed in said housing and separating said bores, a generally annular backup means surrounding at least a portion of said enclosure means intermediate the ends thereof, said backup means including a plurality of axially spaced ring members disposed in tandem relationship, and resilient means engaging adjacent ring members for maintaining the axial spacing between said ring members.

2. In a dynamoelectric machine, a hollow housing having a stator structure mounted therein and shaped to define a central rotor bore and an annular stator bore surrounding said rotor bore, a pair of end rings disposed at the extremities of said stator bore, a generally cylindrical enclosure means disposed in said housing separating said bores and secured to said end rings, a generally annular backup means positioned axially between one of said end rings and the adjacent end of said stator structure and surrounding the adjacent portion of said enclosure means, said backup means having at least three circumferential gaps therein at spaced axial locations along said enclosure means portion, and said gaps being disposed on the surface of said backup means adjacent said enclosure means portion.

3. In a dynamoelectric machine, a hollow housing having a stator structure mounted therein and shaped to define a central rotor bore and an annular stator bore surrounding said rotor bore, generally cylindrical enclosure means disposed in said housing and separating said bores, generally annular backup means surrounding a portion of said enclosure means intermediate the ends thereof, said backup means including a plurality of axially spaced ring members disposed in tandem relationship, means for maintaining the spacing between said ring members, said spacing means including a plurality of sleeve members disposed between adjacent ones of ring members and engaging juxtaposed surfaces thereon, respectively.

4. Apparatus for supporting and protecting a hollow pressure barrier having a generally cylindrical surface thereon and being subjected to relatively high internal pressure, said apparatus comprising a pair of tandemly mounted, spaced support means surrounding spaced portions of said surface and fixedly disposed with respect to said barrier, annular backup means closely receiving a juxtaposed portion of said surface in the opening thereof and disposed between said pair of support means, said juxtaposed surface portion being moved by said pressure into engagement with said backup means, said support means also being moved by said pressure to place said juxtaposed surface portion under strain, and means formed on said backup means for distributing the stresses in said juxtaposed surface portion caused by said pressure over substantially the entire surface area thereof.

5. Apparatus for supporting and protecting a relatively thin generally cylindrical enclosure which is subjected to relatively high internal pressures; said apparatus comprising first support means disposed at the ends of said enclosure for supporting the ends thereof; said enclosure being secured to said support means; a second support means fixedly disposed intermediate said first support means for supporting a juxtaposed portion of said enclosure; said second support means being spaced from at least one of said first support means; third support means for supporting said enclosure disposed in the space between said first and said second support means; said enclosure being moved by said pressure into engagement with said first, second and third support means, said first and second support means being moved by said pressure to place said enclosure under axial strain; and means formed on said third support means for distributing the stresses in said enclosure caused by said pressure over substantially the entire area of said third support means.

6. Apparatus for supporting and protecting a relatively thin generally cylindrical enclosure which is subjected to relatively high internal pressures; said apparatus comprising first support means disposed at the ends of said enclosure for supporting the ends thereof; said enclosure being secured to said support means; a second support means fixedly disposed intermediate said first support means for supporting a juxtaposed portion of said enclosure; said second support means being spaced from at least one of said first support means; third support means for supporting said enclosure disposed in the space between said first and said second support means; said enclosure being moved by said pressure into engagement with said first, second and third support means, said first and second support means being moved by said pressure to place said enclosure under axial strain; and means formed on said third support means for distributing the stresses in said enclosure caused by said pressure to a plurality of positions along said third support means; said positions being substantially equally spaced along at least a portion of said third support means.

7. Apparatus for supporting and protecting a relatively thin generally cylindrical enclosure which is subjected to relatively high internal pressures; said apparatus comprising first support means disposed at the ends of said enclosure for supporting the ends thereof; said enclosure being secured to said support means, a second support means fixedly disposed intermediate said first support means for supporting a juxtaposed portion of said enclosure; said second support means being spaced from at least one of said first support means; and third support means for supporting said enclosure disposed in the space between said first and said second support means; said enclosure being moved by said pressure into engagement with said first, second and third support means; said first and second support means being moved by said pressure to place said enclosure under axial strain; and means formed on said third support means for distributing the stresses in said enclosure caused by said pressure to a plurality of positions along said third support means; at least some of said positions being spaced apart at distances no greater than the friction length of said enclosure.

8. In a canned motor having a sealed rotor chamber which is subjected to high pressure, an elongated motor housing including an outer annular shell member and end members defining the extremities of said housing, a relatively thin cylindrical rotor can disposed within said housing in spaced relationship with said shell and secured at its ends to said housing end members, respectively, said rotor can having its interior defining said rotor chamber, an annular stator structure disposed in the space between said shell and said can, said stator structure being spaced from each of said end members and having its inner surface closely receiving said rotor can, a pair of annular backup means disposed in said housing and positioned between said stator and each of said end members, respectively, each of said backup means closely receiving juxtaposed portions of said can therein, each of said backup means including a plurality of tandemly mounted annuli, resilient means engaging adjacent annuli for axially spacing each of said annuli and for maintaining said annuli in said spaced position, whereby said rotor chamber pressure causes said can to be expanded against said stator structure and each of said annuli.

9. In a canned motor having a sealed rotor chamber which is subjected to high pressure, an elongated motor housing including an outer annular shell member and end members defining the extremities of said housing, a relatively thin cylindrical rotor can disposed within said housing in spaced relationship with said shell and secured at its ends to said housing end members, respectively, said rotor can having its interior defining said rotor chamber, an annular stator structure disposed in the space between said shell and said can, said stator structure being spaced from each of said end members and having its inner surface closely receiving said rotor can, a pair of annular backup means disposed in said housing and positioned between said stator and each of said end members, respectively, each of said backup means closely receiving juxtaposed portions of said can therein, each of said backup means including a plurality of tandemly mounted annuli, means for axially spacing each of said annuli and for maintaining said annuli in said spaced position, at least some of said annuli having their axial dimension no greater than the friction length of said can, whereby said rotor chamber pressure causes said can to be expanded against said stator structure and each of said annuli.

10. In a canned motor having a sealed rotor chamber which is subjected to high pressure, an elongated motor housing including an outer annular shell member and end members defining the extremities of said housing, a relatively thin cylindrical rotor can disposed within said housing in spaced relationship with said shell and secured at its ends to said housing end members, respectively, said rotor can having its interior defining said rotor chamber, an annular stator structure disposed in the space between said shell and said can, said stator structure being spaced from each of said end members and having its inner surface closely receiving said rotor can, a pair of annular backup means disposed in said housing and positioned between said stator and each of said end members, respectively, each of said backup means closely receiving juxtaposed portions of said can therein, each of said backup means including a plurality of tandemly mounted annuli, means for axially spacing each of said annuli and for maintaining said annuli in said spaced position, said spacing means including a plurality of outwardly extending projections disposed respectively on the outward surfaces of said annuli, and spacing sleeves closely receiving said annuli and disposed respectively with the ends of each of said sleeves in engagement with adjacent ones of said projections, whereby said rotor chamber pressure causes said can to be expanded against said stator structure and each of said annuli.

11. In a canned motor having a sealed rotor chamber which is subjected to high pressure, an elongated motor housing including an outer annular shell member and end members defining the extremities of said housing, a relatively thin cylindrical rotor can disposed within said housing in spaced relationship with said shell and secured at its ends to said housing end members, respectively, said rotor can having its interior defining said rotor chamber, an annular stator structure disposed in the space between said shell and said can, said stator structure being spaced from each of said end members and having its inner surface closely receiving said rotor can, a pair of annular backup means disposed in said housing and positioned between said stator and each of said end members, respectively, each of said backup means closely receiving juxtaposed portions of said can therein, each of said backup means including a plurality of tandemly mounted annuli, means for axially spacing each of said annuli and for maintaining said annuli in said spaced position, said spacing means including a plurality of outwardly extending projections disposed respectively on the outward surfaces of said annuli, and spacing sleeves closely receiving said annuli and disposed respectively with the ends of each of said sleeves in engagement with adjacent ones of said projections, at least some of said annuli having their axial dimension no greater than the friction length of said can, whereby said rotor chamber pressure causes said can to be expanded against said stator structure and each of said annuli.

12. In a canned motor having a sealed rotor chamber which is subjected to high pressure, an elongated motor housing including an outer annular shell member and end members defining the extremities of said housing, a relatively thin cylindrical rotor can disposed within said housing in spaced relationship with said shell and secured at its ends to said housing end members, respectively, said rotor can having its interior defining said rotor chamber, an annular stator structure disposed in the space between said shell and said can, said stator structure being spaced from at least one of said end members and having its inner surface closely receiving said rotor can, an annular backup means disposed in said housing and positioned between said stator and said one end member, said backup means closely receiving juxtaposed portions of said can therein, said backup means including a plurality of tandemly mounted annuli, means for axially spacing each of said annuli and for maintaining said annuli in said spaced position, at least some of said annuli having their axial dimension no greater than the friction length of said can, whereby said rotor chamber pressure causes said can to be expanded against said stator structure and each of said annuli.

References Cited by the Examiner

UNITED STATES PATENTS

| | | | |
|---|---|---|---|
| 2,887,062 | 5/1959 | Cametti | 310—86 X |
| 2,996,632 | 8/1961 | Ward | 310—86 |
| 3,101,423 | 8/1963 | Brunot | 310—86 |

MILTON O. HIRSHFIELD, *Primary Examiner.*

ORIS L. RADER, *Examiner.*

J. W. GIBBS, *Assistant Examiner.*